(12) United States Patent
Mitra

(10) Patent No.: US 6,867,727 B1
(45) Date of Patent: Mar. 15, 2005

(54) MULTIPLATFORM MULTIFUNCTION AVIONICS ARCHITECTURE

(75) Inventor: Atindra Mitra, Kettering, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 10/794,544

(22) Filed: Mar. 1, 2004

(51) Int. Cl.[7] .............................. G01S 7/00; G01S 13/00
(52) U.S. Cl. .............................. 342/59; 342/13; 342/21; 342/25 R; 342/25 A; 342/52; 342/58; 342/82; 342/89; 342/175; 342/176; 342/179; 342/190; 342/191; 342/192; 342/195; 342/196
(58) Field of Search ........................... 342/82–88, 176, 342/179, 190, 191, 192–197, 450–465, 13–22, 25 R–26 D, 52–60, 89–103; 89/1.11; 375/130–153, 316; 370/315, 316, 319, 320, 328, 329, 335, 342; 455/7, 11.1, 12.1–13.4, 73, 90.2

(56) References Cited

U.S. PATENT DOCUMENTS

| 6,026,125 A | | 2/2000 | Larrick, Jr. et al. | |
|---|---|---|---|---|
| 6,043,756 A | * | 3/2000 | Bateman et al. | 342/26 R |
| 6,239,741 B1 | * | 5/2001 | Fontana et al. | 342/195 |
| 6,567,044 B2 | * | 5/2003 | Carroll | 342/465 |
| 6,653,970 B1 | * | 11/2003 | Mitra | 372/22 |
| 6,690,318 B1 | * | 2/2004 | Tsunoda | 372/59 |
| 6,690,741 B1 | | 2/2004 | Larrick, Jr. et al. | |
| 6,727,841 B1 | * | 4/2004 | Mitra | 342/25 R |

OTHER PUBLICATIONS

A. Mitra et al, "Avionics Architectures for Real–Time Multi–Platform Spectrum Allocation", Proceedings of the Digital Avionics Systems Conference, Oct. 2003, Indianapolis, IN.

* cited by examiner

*Primary Examiner*—Bernarr E. Gregory
(74) *Attorney, Agent, or Firm*—Gina S. Tollefson; Gerald B. Hollins; Fredric L. Sinder

(57) ABSTRACT

A system-of-systems avionics architecture that is compatible with futuristic multi-function multi-platform sensor applications. The method and device of the invention is based on localized "adaptive" waveform and spectrum allocation for ultra-wideband radio frequency and microwave signals. The invention includes a plurality of system platforms with each platform comprising a common radio frequency front end for receiving ultra-wideband signals, a common radio frequency back end for transmitting ultra-wideband signals and a plurality of sensors for exchanging data between platforms.

13 Claims, 4 Drawing Sheets

MULTIPLATFORM MULTIFUNCTION AVIONICS ARCHITECTURE

RIGHTS OF THE GOVERNMENT

The invention described herein may be manufactured and used by or for the Government of the United States for all governmental purposes without the payment of any royalty.

BACKGROUND OF THE INVENTION

The invention relates to the field of avionics architectures and more specifically multi-function, multi-platform avionics architecture applications.

The invention introduces the concept of distributing multiple avionics and sensor functions across platforms. The concept of the invention is realized by implementing a mutually interactive sensor architecture on each of a plurality platforms within a localized region. This concept is compatible with "position-adaptive" radar concepts where, for example, multiple small-UAV (unmanned air vehicle) platforms mutually-interact to robotically or self-adaptively optimize their own position to collect intelligence information for a given scenario.

The avionics architecture developed for this invention disclosure is highly flexible, adaptive, and programmable with regard to the current state of technology. The approach allows for the development of highly reliable low-cost systems that do not require close adherence to rigid pre-defined tolerances associated with many system specifications. This adaptive architecture allows for "relaxed" tolerances on systems specifications and enables the development of mutually interactive multi-function multi-platform systems without the significant degradations in performance associated with implementing multiple simultaneous functions based on mutually exclusive design specifications. This general architectural approach, in turn, addresses many of the current challenges of UWB (ultra-wideband) radar and communications technology and shows potential for development of UWB systems that operate at longer ranges than the current near-range systems concepts.

SUMMARY OF THE INVENTION

A system-of-systems avionics architecture that is compatible with futuristic multi-function multi-platform sensor applications. The method and device of the invention is based on localized "adaptive" waveform and spectrum allocation for ultra-wideband radio frequency and microwave signals. The invention includes a plurality of system platforms with each platform comprising a common radio frequency front end for receiving ultra-wideband signals, a common radio frequency back end for transmitting ultra-wideband signals and a plurality of sensors for exchanging data between platforms.

DETAILED DESCRIPTION

The invention is a system-of-systems avionics architecture that is compatible with futuristic multi-function multi-platform sensor applications. The method and device of the invention is based on localized "adaptive" waveform and spectrum allocation for ultra-wideband (UWB) radio frequency (RF) and microwave signals. The systems engineering, modeling, and analysis of the method and device of the invention is based on a signal requirements analysis within a local region of interest where a collection of notional platforms, each with a given set of sensor requirements, is visualized. During initial deployment, the waveform parameters for each platform are left in an indeterminate state. Then, the parametric sensor requirements, for each sensor, are mapped to real-time waveform design parameters.

Figure 1:
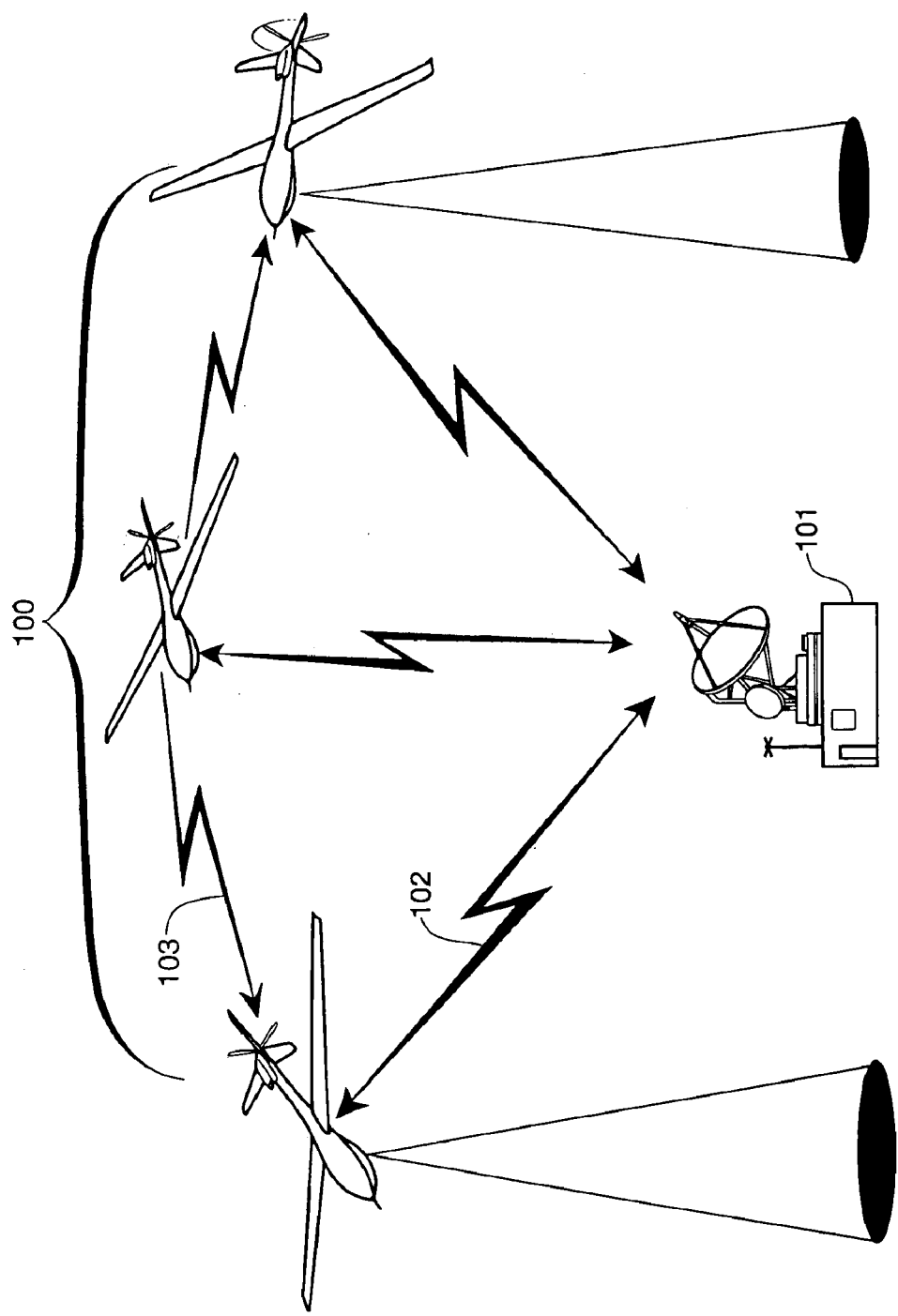
FIG. 1 shows a notational multi-platform multi-function scenario of the invention.

FIG. 1 depicts the notional platform-interactive scenario. Notational platforms are illustrated as aircraft 100 in FIG. 1. A radio frequency emitter is illustrated at 101 with a signal communication between an emitter and platform illustrated at 102. An example of an interaction between platforms, of which there may be many, is illustrated at 103.

Figure 2:
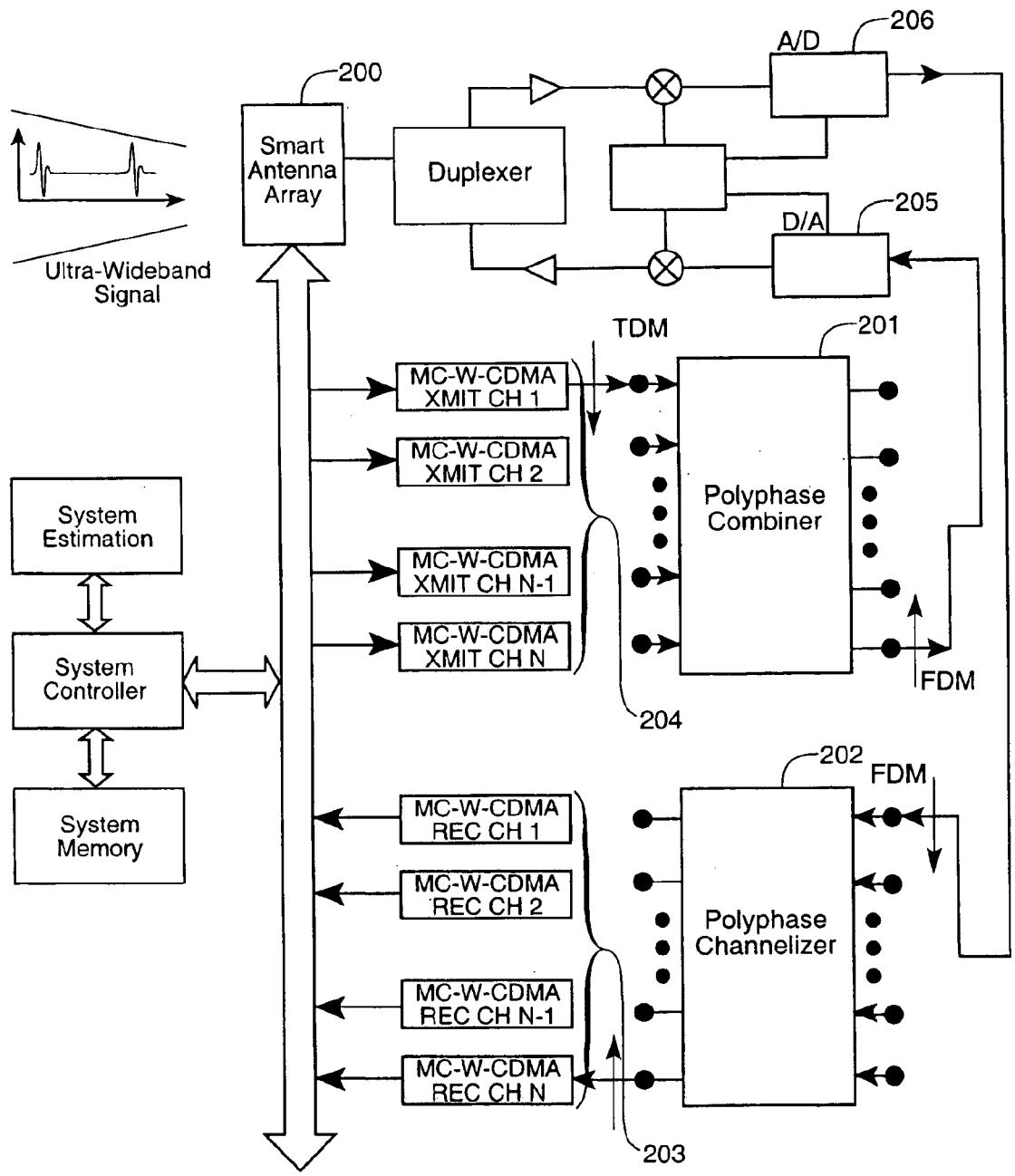
FIG. 2 shows a multi-platform multi-function architecture arrangement of the invention.

FIG. 2 is a block diagram that shows a multi-platform multi-function architecture arrangement of the invention. The concept involves system-of-systems designs where each platform has a common (scalable) RF front-end. The back-end architecture for each platform (everything behind the RF front-end) is a modular digital architecture where the specific choice of a modular back-end configuration is programmable based on the functional requirements of each localized platform. FIG. 2 illustrates many of the features of the multi-sensor multi-platform avionics architecture of the invention.

The FIG. 2 arrangement of the invention is a flexible architecture that allows for a very high degree of real-time reconfiguration relative to the current state-of-the-art in high sample-rate digital technology. For example two arrangements of the invention, or sample application scenarios, that may be considered are as follows:

Detection of Embedded Communications Signals

Consider three Mini-UAV's, such as those illustrated at 100 in FIG. 1. Each of the three Mini-UAV's have a configured implementation of the architecture of FIG. 2. Mini-UAV-1 detects low-power cell phone signals within the region-of-interest and transmits signals to Mini-UAV-3. Mini-UAV-2 performs a UWB radar tracking function over the region of interest and reports moving objects-of-interest to Mini-UAV-3. Mini-UAV-3 functions as a hovering "Communications and Control" repository that transmits/receives data from a high-altitude or medium-altitude UAV platform that is outside the region-of-interest as well as receiving and transmitting communications and control data from Mini-UAV-1 and Mini-UAV-2. Mini-UAV-1, Mini-UAV-2, and Mini-UAV-3 are all located within the region of interest and perform EW (electronic warfare), UWB radar, and communications functions, respectively.

Mapping Internal Structure of Building with Group of Mini-UAV's

Each Mini-UAV has a configured implementation of the architecture of FIG. 2. Each implementation is programmed to perform simultaneous UWB radar and communications. Under the systems-of-systems concepts, each Mini-UAV receives coded radar signals that are transmitted by all of the other Mini-UAV's that surround a building-of-interest. Each Mini-UAV also has a RF communications capability with all the other Mini-UAV's. This concept allows the distributed group of Mini-UAV's to self-adapt in position and find the optimum "RF leakage" points in the building for purposes of mapping the internal structure of the building-of-interest.

The architecture of FIG. 2 allows for the optimal implementation of simultaneous radio frequency functions such as multiple communications functions, multiple radar functions, and multiple receiver functions for electronic warfare applications. Advanced modules within the architecture of FIG. 2, examples of what may be used to implement the arrangements described, include a smart antenna module 200, a polyphase channelizer 202 and combiner 201, and a multi-carrier wideband code-division multiple access CDMA (MC-W-CDMA) receiver 203 and transmitter modules 204. The polyphase channelizer module 202 is a digital function that splits a received ultra-wideband signal into a series of wideband CDMA (code division multiple access) channels. Similarly, the polyphase combiner module 201 combines a series of wideband CDMA channels into an ultra-wideband transmit signal. The smart antenna module 200 is a concept that incorporates a "smart" digital interface and is comprised of a number of "narrowband" sub-arrays and "narrowband" T/R modules (transmit/receive modules). The internal signals from each of the smart antenna sub-arrays are summed together to form the composite ultra-wideband signal.

Additionally, the architecture also accommodates future developments in high-throughput digital technologies such as advances in analog-to-digital (A/D), digital-to-analog converters (D/A), and direct digital waveform synthesis (DDS) techniques. The architecture accommodates these advances by providing a one-to-one swapping capability for these modules with the effect of continuously integrating technology advances. For example, advances in manufactured bandwidth specification capabilities for wideband A/D converters can be easily incorporated into this flexible architecture my swapping A/D modules with minimal effect on the specifications for many of the other (re-programmable) modules within this architecture.

The philosophy behind the operation of the architecture of FIG. 2 can be described as a continuous and adaptive rotation cycle between the following functions: receiving a radio frequency signal, channelizing a received signal and, analyzing the signal through spectrum estimation and intelligent signal analysis. In preparation for signal transmission, spatial degrees of freedom are adjusted using digital control of the smart antenna and temporal degrees of freedom are adjusted using digital coding of sub-channels. Finally, the desired signal is isolated using digital control of the smart antenna and digital filtering of subchannels and the process repeats itself.

For purposes of the smart antenna 200 in FIG. 2, the term "narrowband" implies that the ultra-wideband signal is internally split into multiple channels. Under this concept, the bandwidth of these internal channels may still be relatively large. For example, depending on the application, the bandwidth of the internal sub-array channels may be considerably wider than the wideband CDMA channels, 203 and 204, yet considerably narrower than the ultra-wideband D/A 205 and A/D 206 channels that are shown in FIG. 2.

Future applications of the method and device of the invention include systems development efforts where multiple platforms, all fitted with an avionics chassis that is a scaled and custom-configured version of this architecture, will perform multiple ultra-wideband (UWB) radar, ultra-wideband communications, and wideband communications in a given localized region that also contain many interference sources. Under this type of scenario, the characteristics of these interference sources will be estimated and updated in real-time along with "intelligent" multi-sensor parameters that are specifically optimized for the given scenario in order to derive intelligent and optimized waveform parameters and codes. In other words, each platform will determine its own waveform parameters via a process of "intelligent" real-time mutual interactions between platforms, real-time spectral estimation of the interference environment, and real-time mutual optimization of the overall multi-sensor parameters based on the requirements of the given scenario. For example, a group of Mini-UAV's can be notionally deployed from a remote location to a fairly large region-of-interest. Each Mini-UAV can be programmed or configured with "intelligent" narrowband waveform parameters to survey a different segment of this large region of interest. During the progression of this deployment from a remote location, this distributed group of Mini-UAV's interact with each other via multi-function RF links to "intelligently" modify waveform parameters from steadily narrowband parameters to wideband parameters that allow this distributed group of robotic Mini-UAV's to adaptively narrow the region-of-interest and collect intelligence information over a isolated critical sub-region of interest. These waveforms can also be steadily adjusted depending on the material properties of the region, sub-regions, and objects-of-interest to be surveyed.

The method and device of the invention is of particular interest in terms of the growth potential for low-frequency ultra-wideband radar technology. Under the current state of this technology, when considered in realistic radio frequency interference (RFI) environments (with many omni-directional radio and television stations), current UWB radar systems experience many performance degradations. These systems can be developed under the multi-sensor architecture of FIG. 2 with the effect of increased sensitivity and lower-power requirements due to the adaptive band-by-band digital coding features of this type of system. For example, a group of platforms can be deployed for a low-frequency UWB radar application over a region-of-interest that contains many UHF television stations. Specific sub-channels of this distributed UWB radar configuration can be coded with spread-spectrum codes that allow this UWB radar implementation to receive the coded transmit waveforms and filter the interference from the TV stations on a per-sub-channel basis. In addition, the smart beamforming and multi-platform features of this architecture will allow for a distributed solution to the UWB radar problem where different platforms can form different beams to allow for many distributed and platform-interactive spatial degrees of freedom.

For the digital transmitter portion of the multi-function transceiver architecture in FIG. 2, the ultra-wideband signal processing is accomplished via a hierarchal two-layer approach. In the first layer, several baseband channels are coded using a technique known as multi-carrier wideband code-division multiple access (MC-W-CDMA). During the second layer, the signals from each channel are combined to form the composite ultra-wideband signal. This type of hierarchal approach allows many UWB signals to coexist in the same local region with a minimal amount of mutual interference. Also, this approach allows for more flexibility than many present and proposed methods of generating UWB signals that employ spark-gap technology.

Figure 3:
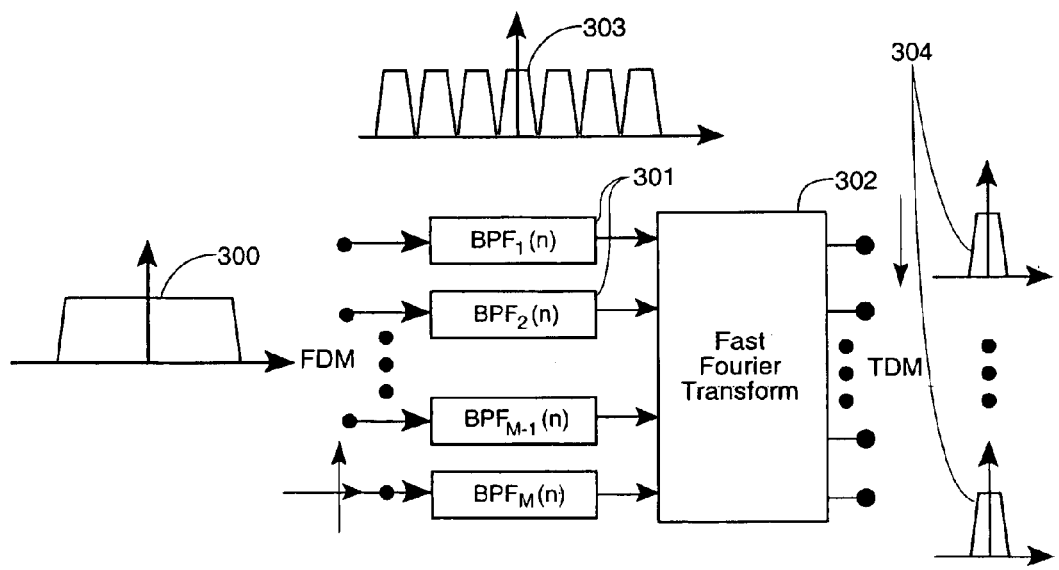
FIG. 3 shows a polyphase receiver channelizer for the architecture of FIG. 2.

Under this architecture, the digital receiver sections are also organized in a two-layer hierarchal architecture where the processing steps are in reverse order in comparison with the transmitter. FIG. 3 is a block diagram of the polyphase channelizer layer for the architecture of FIG. 2 along with some plots that represent the internal signal flow. In FIG. 3, the polyphase channelizer down-converts the received UWB signal 300 into a set of frequency-division-multiplexed (FDM) channels. (Similarly, the digital polyphase combiner shown at 201 in FIG. 2 in the digital transmitter section simultaneously up-converts a set of baseband signals to form the composite UWB transmit signal.) As indicated in the plots of FIG. 3, the operation of the digital polyphase channelizer is visualized as an input commutator 303 that performs a resampling operation for each parallel channel 304, parallel polyphase filter banks, two of which are shown at 301, to bandpass filter each resampled channel, and a fast Fourier transform (FFT) operation, illustrated at 302, for phase alignment.

Figure 4:
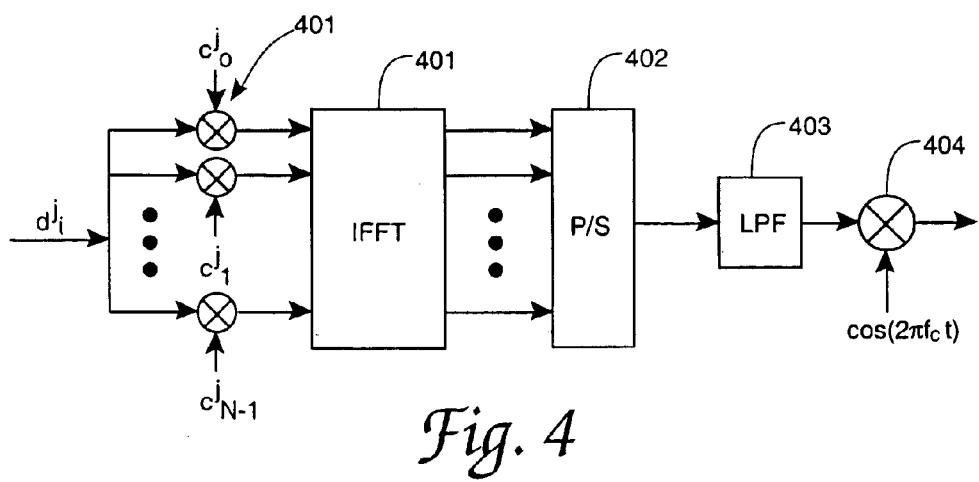
FIG. 4 shows a transmission diagram for MC-W-CDMA channel.

Eq. 1 is a signal model for the $j^{th}$ data bit of the MC-W-CDMA transmission coding layer.

$$s(t) \approx \sum_{k=1}^{N-1} d_i^j c_k^j \cos(2\pi f_c t + 2\pi \Delta f \ t) \quad (1)$$

where $d_i^h$—$j^{th}$ data bit of data word from $i^{th}$ user
$C_k^j$—code bit for $k^{th}$ sub-channel
$f_c$—channel center frequency FIG. 4 shows a FFT-based implementation of a transmission signal flow model, on a per-channel and per-bit basis, for the MC-W-CDMA coding layer. The column at 400 represents convolution of data bits, d, with code bits, c. The convoluted data and code bits from 400 are then filtered through an Inverse Fast Fourier Transform operation at 401. A parallel-to-serial conversion is then performed at 402. Finally, there is a frequency up-conversion at 404. The signal flow model for the receiver channels, on a per-channel and per-bit basis, can be visualized in a reverse flow order from FIG. 4. As indicated in FIG. 4, the parallel structure of this multi-sub-carrier-based coding method allows for high data throughput. In addition, this technique has been shown to generate good performance over frequency-dispersive channels.

A basic analysis of multi-user interference parameters for purposes of UWB system design for this avionics architecture can be performed via observation of Eq. 2.

$$N_t^{UWB} \approx (1 + \psi) \left\{ \frac{(K_{UWB} - \delta) E_P^{UWB}}{G_{UWB}} + \frac{(\varsigma_{in} + \varsigma_{out}) K_{MC} E_P^{MC}}{G_{MC}} \right\}. \quad (2)$$

where $N_t^{UWB}$—Interference for Receive UWB Signal
$\psi$—Intercell Interference Factor
$K_{UWB}$—Number of UWB Users
$\delta$—Orthogonality Factor
$E_P^{UWB}$—Energy per UWB Pulse
$G_{UWB}$—Processing Gain for UWB Signals
$\varsigma_{is}$—Channel Spectral Overlay Factor Within Cell
$\varsigma_{out}$—Channel Spectral Overlay Factor Outside Cell
$K_{MC}$—Number of Users for MC-W-CDMA Channel
$E_P^{MC}$—Energy per MC-W-CDMA Channel Pulse
$G_{MC}$—Processing Gain for MC-W-CDMA Channel.

These parameters can be designed and selected to meet given SNR (signal-to-noise ratio) and BER (bit error rate) requirements for a given multi-function multi-platform application.

Multi-Sensor Antenna Diversity Concepts

Figure 5:
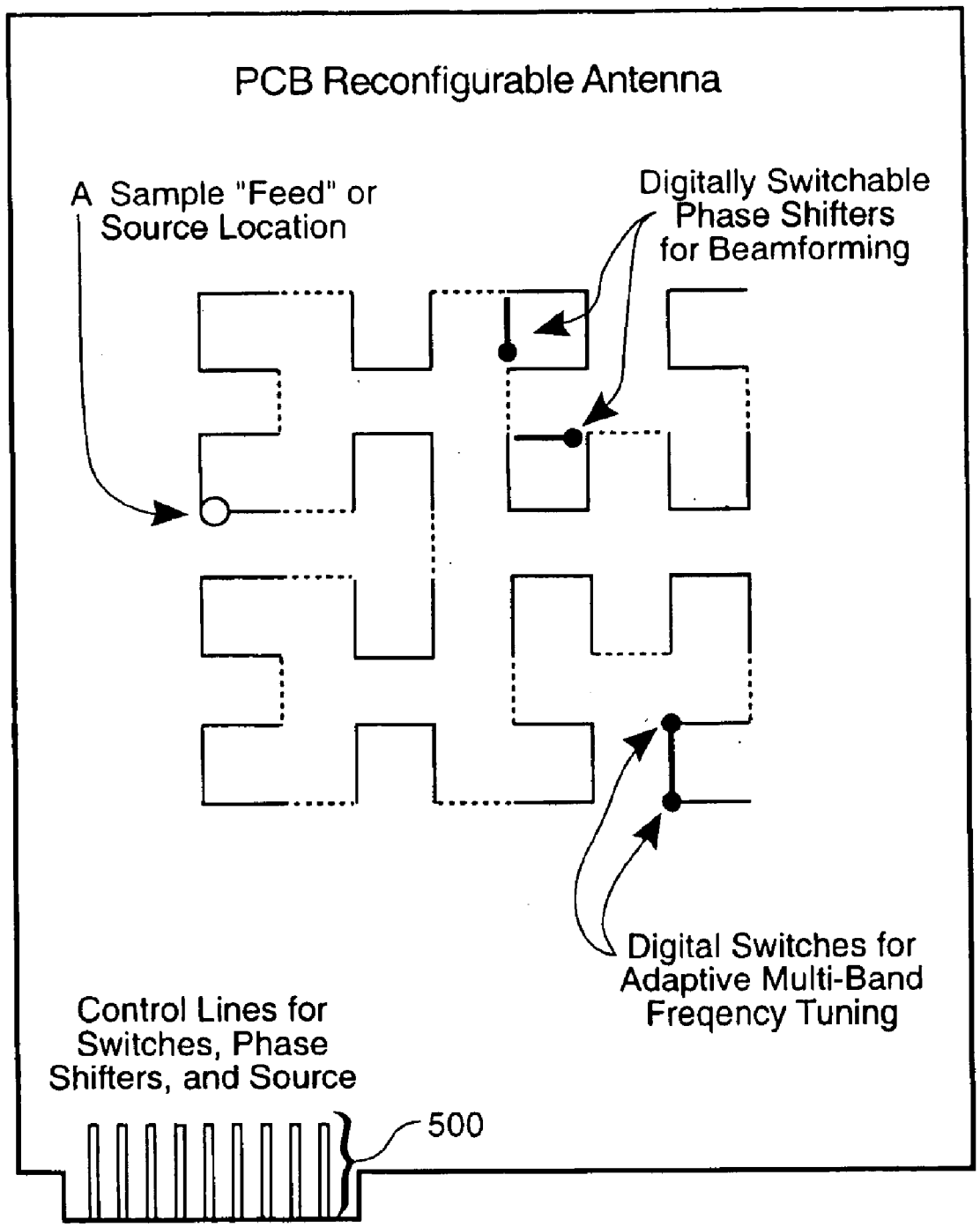
FIG. 5 shows a multi-platform multi-function architecture having a PCB

Smart antenna concepts for the architecture in FIG. 2 are motivated by recent advances in basic antennas research as well as MEMS/NEMS (micro and nano electromechanical systems) technologies. FIG. 5 is an illustration of a sample smart antenna concept for this application. This concept is based on a fractal antenna structure that is digitally controlled with MEMS phase shifters and switches, illustrated at 500. Under the concept, a multi-band frequency pattern can be digitally controlled in real-time with the MEMS switches and the antenna beam pattern can be digitally controlled in real-time with the MEMS phase shifters.

Design principles for these types of digitally controllable adaptive antennas are currently under investigation within the applied electromagnetics materials research communities. For example, one approach to estimating the resonances for the multi-band digital antenna structure of FIG. 5 is to iteratively solve Eq. 3.

These smart and adaptive antennas concepts are integral to the flexible systems architecture of FIG. 2. The architecture incorporates digitally programmable waveform diversity and antenna/spatial diversity in order to meet the requirements for future multi-function and multi-platform systems. For example, a programmable operating system concept can be implemented with this architecture where a number of platforms converge to a region-of-interest that is embedded with many intense RFI sources. With this architecture, each platform can mutually interact in continuous real-time to determine and continuously update waveform and beamforming requirements to develop new temporally and spatially distributed system capabilities in relation to the current state-of-the-art.

It is understood that certain modifications to the invention as described may be made, as might occur to one with skill in the field of the invention, within the scope of the appended claims. All embodiments contemplated hereunder which accomplish the objects of the invention have therefore not been shown in complete detail. Other embodiments may be developed without departing from the spirit of the invention or from the scope of the appended claims.

What is claimed is:

1. A method for optimal implementation of simultaneous RF functions for electronic warfare applications comprising the steps of:

receiving ultra-wideband signals using a common radio frequency front end;

channelizing signals from said receiving step using a polyphase channelizer;

estimating a spectrum from signals from said channelizing step;

adjusting spatial and temporal degrees of freedom;

isolating desired receive signal;

transmitting said signal from said isolating step; and repeating said receiving, channelizing, estimating, preparing, isolating, and transmitting steps.

2. The method of claim 1 wherein said receiving step further comprises receiving ultra-wideband signals using a smart antenna.

3. The method of claim 1 wherein said preparing step further comprises preparing signals for transmission by adjusting spatial degrees of freedom for signal transmission by digital control of smart antenna.

4. The method of claim 1 wherein said preparing step further comprises preparing signals for transmission by adjusting temporal degrees of freedom for signal transmission by digital coding of sub channels.

5. The method of claim 1 wherein said isolating step further comprises isolating desired receive signal by digital control of said smart antenna.

6. The method of claim 1 wherein said isolating step further comprises isolating desired receive signal by digital filtering of subchannels.

7. The method of claim 1 wherein said transmitting step further comprises the steps of:

coding a plurality of baseband channels;

up converting signals from said plurality of baseband channels; and combining signals from each of said channels to form a composite ultra-wideband signal.

8. The method of claim 7 wherein said coding step further comprises the steps of:

convolving data bits with code bits;

filtering output of said convolving step through an inverse Fast Fourier transform operation;

converting output of said filtering step from parallel to serial channels; and filtering output of said converting step through a low-pass filter.

9. The method of claim 1 wherein said coding step further comprises coding a plurality of baseband channels using a multi-carrier wideband code-division multiple access technique.

10. The method of claim 1 wherein said transmitting step further comprises the steps of:

downconverting a received signal into a set of frequency-division-mulitiplexed channels;

resampling output from said downconverting step;

bandpass filtering each signal from said performing step; and performing a Fast Fourier transform operation on each of said signals for phase alignment.

11. A real time, reconfigurable architecture for multi-function, multi-platform applications comprising:

a plurality of system platforms;

each of said system platforms comprising:

a common radio frequency front end for receiving ultra-wideband signals comprising:

a smart antenna module;

a polyphase channelizer;

a multi-carrier wideband code-division multiple access receiver;

a common radio frequency back end for transmitting ultra-wideband signals comprising:

a polyphase combiner; and a multi-carrier wideband code-division multiple access transmitter.

12. The real time, reconfigurable architecture for multi-function, multiplatform applications of claim 11 wherein each of said system platforms comprises a plurality of sensors for exchanging data between said system platforms.

13. The real time, reconfigurable architecture for multi-function, multiplaftorm applications of claim 11 wherein said smart antenna module further comprises a plurality of narrowband subarrays; and a plurality of narrowband transmit/receive modules, wherein signals from said narrowband subarrays are summed together to form a composite ultra wideband signal for transmission.

* * * * *